(12) United States Patent
Svendsen et al.

(10) Patent No.: US 11,606,124 B2
(45) Date of Patent: Mar. 14, 2023

(54) ANTENNA ARRAY FOR ENHANCED MIMO THROUGHPUT

(71) Applicant: NOKIA TECHNOLOGIES OY, Espoo (FI)

(72) Inventors: Simon Svendsen, Aalborg (DK); Christian Rom, Aalborg (DK); Benny Vejlgaard, Gistrup (DK); Johannes Harrebek, Aalborg (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/526,654

(22) Filed: Nov. 15, 2021

(65) Prior Publication Data

US 2022/0158699 A1    May 19, 2022

(30) Foreign Application Priority Data

Nov. 16, 2020   (FI) ..................................... 20206157
Jan. 15, 2021   (FI) ..................................... 20215055

(51) Int. Cl.
*H04L 1/02*         (2006.01)
*H04B 7/0456*       (2017.01)
(Continued)

(52) U.S. Cl.
CPC ......... *H04B 7/0456* (2013.01); *H04B 7/0426* (2013.01); *H04B 17/318* (2015.01); *H04B 17/336* (2015.01); *H04W 24/08* (2013.01)

(58) Field of Classification Search
CPC ................ H04B 7/0456; H04B 7/0426; H04B 17/318; H04B 17/336; H04B 7/0802;
(Continued)

(56) References Cited

U.S. PATENT DOCUMENTS 5,581,260 A * 12/1996 Newman ................ H01Q 25/00
                                                   342/372
2013/0237294 A1    9/2013 Periyalwar et al.
(Continued)

FOREIGN PATENT DOCUMENTS

EP            1643661 A2      4/2006
KR      WO 2020222337 A1 *   11/2020
(Continued)

OTHER PUBLICATIONS

Office Action and Search Report dated May 10, 2021 corresponding to Finnish Patent Application No. 20215055.
(Continued)

*Primary Examiner* — Helene E Tayong
(74) *Attorney, Agent, or Firm* — Squire Patton Boggs (US) LLP

(57) ABSTRACT

An apparatus comprising: an antenna array comprising a plurality of antenna elements configured for receiving multiple input multiple output (MIMO) signals. The antenna array comprises at least a first subpart of the antenna array comprising a first subsection of the plurality of antenna elements. A second subpart of the antenna array comprises a second subsection of the plurality of antenna elements. An alignment of the antenna elements in the second subpart deviates substantially by 30°-60° from an alignment of the antenna elements in the first subpart.

14 Claims, 6 Drawing Sheets

(51) Int. Cl.
*H04B 17/318* (2015.01)
*H04B 17/336* (2015.01)
*H04B 7/0426* (2017.01)
*H04W 24/08* (2009.01)

(58) Field of Classification Search
CPC .............. H04B 7/0874; H04B 7/0486; H04B 7/0413; H04B 7/10; H04W 24/08; H04L 5/0048
USPC ....................................................... 375/267
See application file for complete search history.

(56) References Cited

U.S. PATENT DOCUMENTS

| | | | |
|---|---|---|---|
| 2014/0203995 A1* | 7/2014 | Romney | H01Q 21/065 343/893 |
| 2016/0128023 A1 | 5/2016 | Gustavsson et al. | |
| 2017/0012363 A1 | 1/2017 | Zou et al. | |
| 2017/0222315 A1* | 8/2017 | Hozouri | H04B 7/0617 |
| 2017/0244467 A1 | 8/2017 | Cho et al. | |
| 2018/0184441 A1 | 6/2018 | Faxér et al. | |
| 2021/0321267 A1 | 10/2021 | Kim | |

FOREIGN PATENT DOCUMENTS

| | | |
|---|---|---|
| WO | WO 2014/161566 A1 | 10/2014 |
| WO | WO 2019/075236 A2 | 4/2019 |
| WO | 2020/046062 A1 | 3/2020 |
| WO | WO 2020/222337 A1 | 11/2020 |

OTHER PUBLICATIONS

Communication of Acceptance under section 29a of Patents Decree dated Jun. 23, 2021 corresponding to Finnish Patent Application No. 20215055.

Catt, "Views on antenna configuration for above 6 GHz NR," 3GPP Draft; R1-165056, 3GPP TSG RAN WG1 Meeting #85, Nanjing, China, May 14, 2016.

Extended European Search Report dated May 2, 2022 corresponding to European Patent Application No. 21207386.0.

* cited by examiner

Legend

30 – Housing
32 – Display
34 – Keypad
36 – Microphone
38 – Earpiece
50 – Apparatus

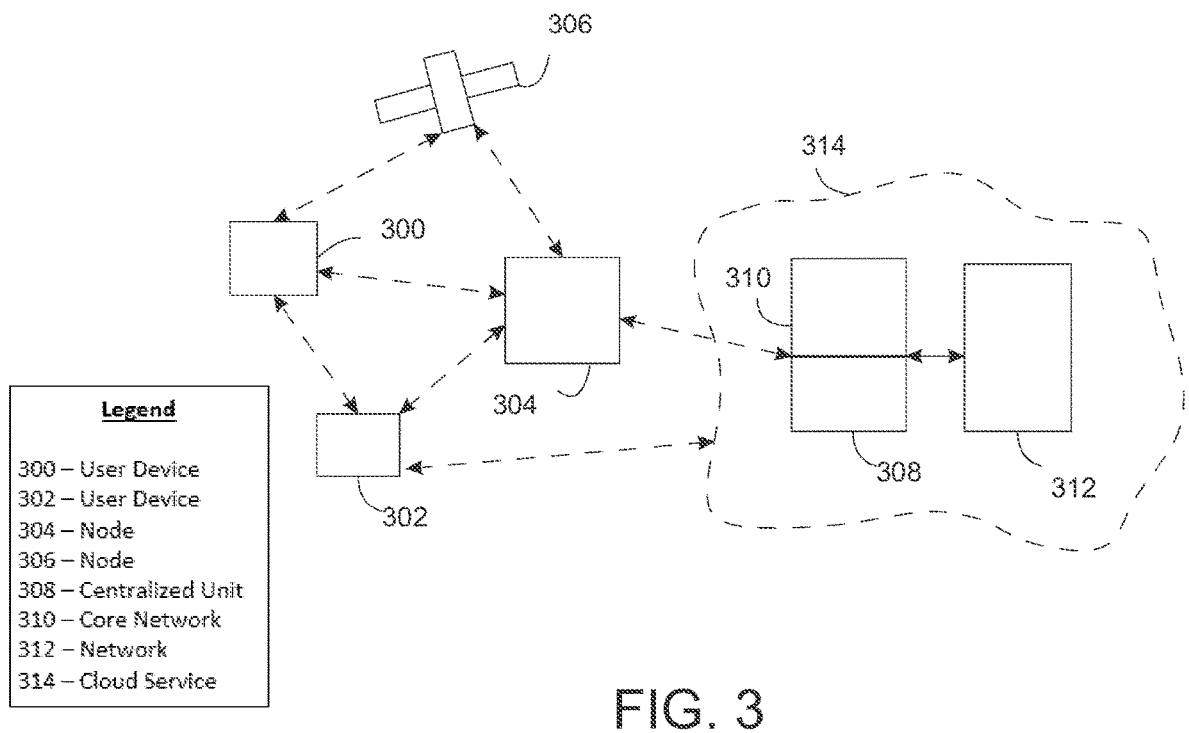
FIG. 3
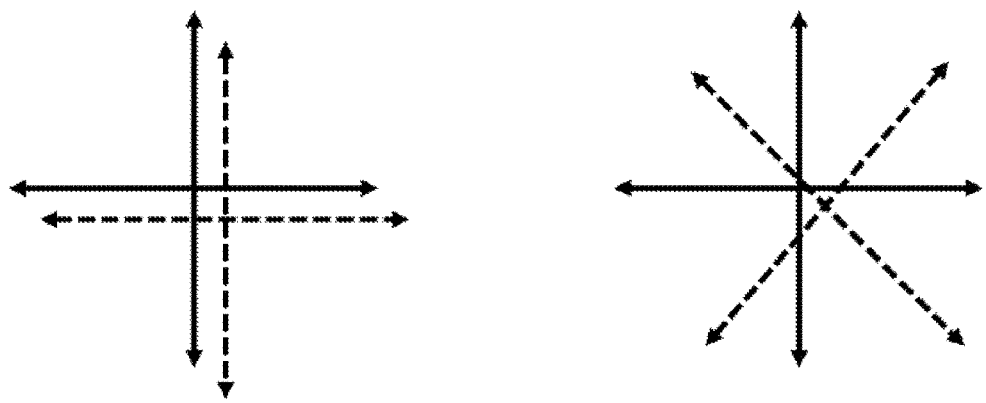
FIG. 4a
FIG. 4b

ANTENNA ARRAY FOR ENHANCED MIMO THROUGHPUT

TECHNICAL FIELD

The present invention relates to the field of wireless communications and, particularly, to Multiple Input, Multiple Output (MIMO) technology.

BACKGROUND

Today's and future wireless communication systems, such as Long Term Evolution (LTE) or $5^{th}$ Generation (5G), also referred to as New Radio (NR), have been envisaged to use MIMO multi-antenna transmission techniques. Constantly increasing requirements for high throughput motivates the wireless communication systems such as 5G to use the mmWave (millimeter wave) frequencies due to available high bandwidth.

However, the usage of mmWave frequencies poses new challenges on MIMO performance. Thus, factors such as changes in surrounding environment or physical orientation of antennas will have an increased performance impact, which needs to be taken into account for achieving desired performance.

SUMMARY

Now, an improved method and technical equipment implementing the method has been invented, by which the above problems are alleviated. Various aspects include a method, an apparatus and a non-transitory computer readable medium comprising a computer program, or a signal stored therein, which are characterized by what is stated in the independent claims. Various details of the embodiments are disclosed in the dependent claims and in the corresponding images and description.

The scope of protection sought for various embodiments of the invention is set out by the independent claims. The embodiments and features, if any, described in this specification that do not fall under the scope of the independent claims are to be interpreted as examples useful for understanding various embodiments of the invention.

According to a first aspect, there is provided an apparatus comprising an antenna array comprising a plurality of antenna elements configured for receiving multiple input multiple output (MIMO) signals, wherein the antenna array comprises at least a first subpart of the antenna array comprising a first subsection of the plurality of antenna elements; and a second subpart of the antenna array comprising a second subsection of the plurality of antenna elements, wherein an alignment of the antenna elements in the second subpart deviates substantially by 30°-60° from an alignment of the antenna elements in the first subpart.

According to an embodiment, the apparatus comprises means for determining a value of at least one quality metric for a received multiple input multiple output (MIMO) signal; means for comparing the determined value of the at least one quality metric to a corresponding threshold value; and means for determining, based on the result of the comparison of the value of the at least one quality metric, whether to use the full antenna array or either the first or the second subpart of the antenna array for receiving the signals.

According to an embodiment, the at least one quality metric comprises a first quality metric of a reference signal received power (RSRP) and a second quality metric of signal-to-interference and noise ratio (SINR), wherein said means for determining is configured to control, in response to either the value of the first quality metric or the second quality metric being below the corresponding threshold value, the apparatus to use the full antenna array for receiving the signals.

According to an embodiment, the at least one quality metric comprises a third quality metric for determining a MIMO performance of a channel matrix for downlink transmission.

According to an embodiment, the third quality metric is at least one of the following: a MIMO rank, a matrix determinant, a condition number, singular values, eigenvalues.

According to an embodiment, the apparatus comprises means for measuring at least a MIMO performance of the first subpart of the antenna array and a MIMO performance of the second subpart of the antenna array.

According to an embodiment, the MIMO performance of the subparts are configured to be measured in response to the value of the first quality metric and the second quality metric being at least equal to the corresponding threshold value.

According to an embodiment, the apparatus comprises means for determining a best value among the MIMO performance values of the at least first subpart and the second subpart of the antenna array; means for comparing the best MIMO value to a corresponding threshold value; and means for controlling, in response to the best MIMO value being at least equal to the corresponding threshold value, the subpart of the antenna array having the best MIMO value to be used for receiving the signals according to MIMO full Rank operation.

According to an embodiment, said means for controlling, in response to the best MIMO value being below to the corresponding threshold value, is configured to control the apparatus to use the full antenna array for receiving the signals.

According to an embodiment, the MIMO performance of the subparts are configured to be measured based on a received reference signal.

According to an embodiment, the alignment of the antenna elements in the second subpart deviates substantially by 45° from the alignment of the antenna elements in the first subpart.

According to an embodiment, the antenna elements of the first subpart are adjacent to each other and the antenna elements of the second subpart are adjacent to each other.

According to an embodiment, the antenna elements of the first subpart are at least partly interleaved with the antenna elements of the second subpart.

A method according to a second aspect comprises: determining a value of at least one quality metric for a received multiple input multiple output (MIMO) signal; comparing the determined value of the at least one quality metric to a corresponding threshold value; and determining, based on the result of the comparison of the value of the at least one quality metric, whether to use a full antenna array comprising a plurality of antenna elements or either a first subpart of the antenna array comprising a first subsection of the plurality of antenna elements or a second subpart of the antenna array comprising a second subsection of the plurality of antenna elements, wherein an alignment of the antenna elements in the second subpart deviates substantially by 30°-60° from an alignment of the antenna elements in the first subpart for receiving the signals.

An apparatus according to a third aspect comprises: at least one processor and at least one memory, said at least one memory stored with computer program code thereon, the at least one memory and the computer program code configured to, with the at least one processor, cause the apparatus at least to perform: determine a value of at least one quality metric for a received multiple input multiple output (MIMO) signal; compare the determined value of the at least one quality metric to a corresponding threshold value; and determine, based on the result of the comparison of the value of the at least one quality metric, whether to use a full antenna array comprising a plurality of antenna elements or either a first subpart of the antenna array comprising a first subsection of the plurality of antenna elements or a second subpart of the antenna array comprising a second subsection of the plurality of antenna elements, wherein an alignment of the antenna elements in the second subpart deviates substantially by 30°-60° from an alignment of the antenna elements in the first subpart for receiving the signals.

Computer readable storage media according to further aspects comprise code for use by an apparatus, which when executed by a processor, causes the apparatus to perform the above methods.

BRIEF DESCRIPTION OF THE DRAWINGS

For a more complete understanding of the example embodiments, reference is now made to the following descriptions taken in connection with the accompanying drawings in which:

FIG. 3 shows a part of an exemplifying radio access network;

FIGS. 4a and 4b illustrate examples of polarization alignment of an antenna array with an incoming signal;

DETAILED DESCRIPTION OF SOME EXAMPLE EMBODIMENTS

The following describes in further detail suitable apparatus and possible mechanisms for implementing MIMO antenna array arrangements. While the following focuses on 5G networks, the embodiments as described further below are by no means limited to be implemented in said networks only, but they are applicable in any network incorporating MIMO antenna arrays.

Figure 1:
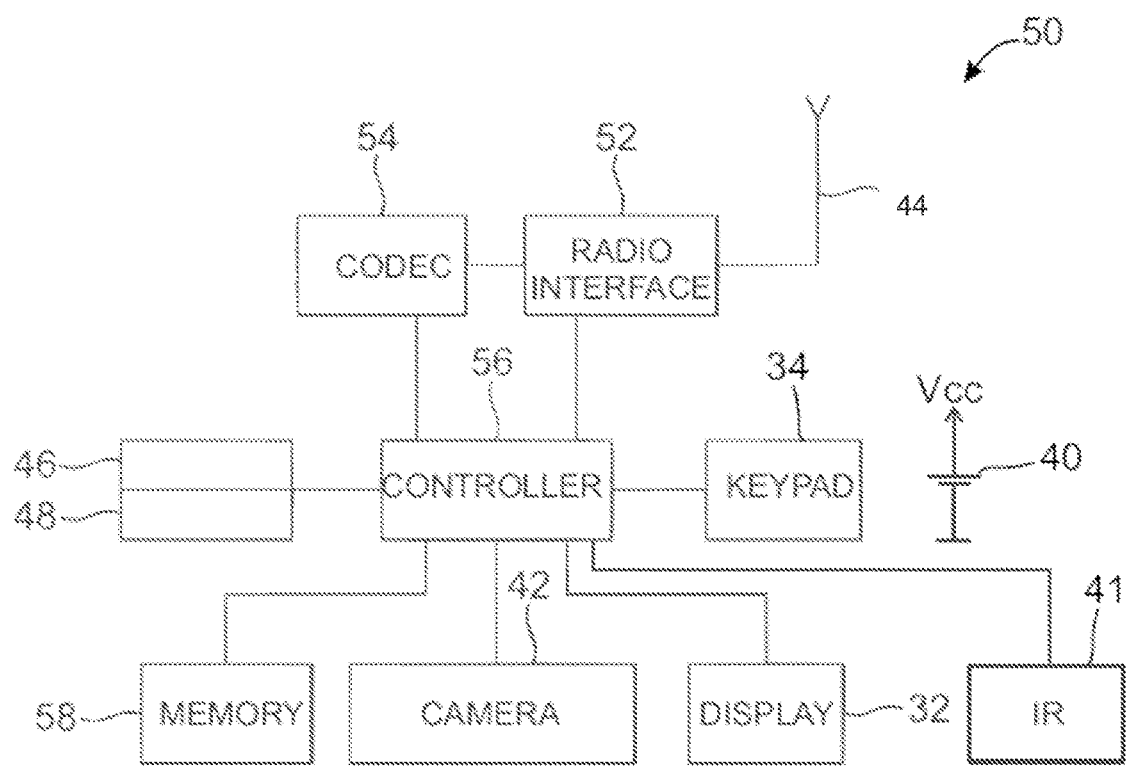
FIG. 1 shows a schematic block diagram of an apparatus for incorporating an antenna array arrangement according to the embodiments.
Figure 2:
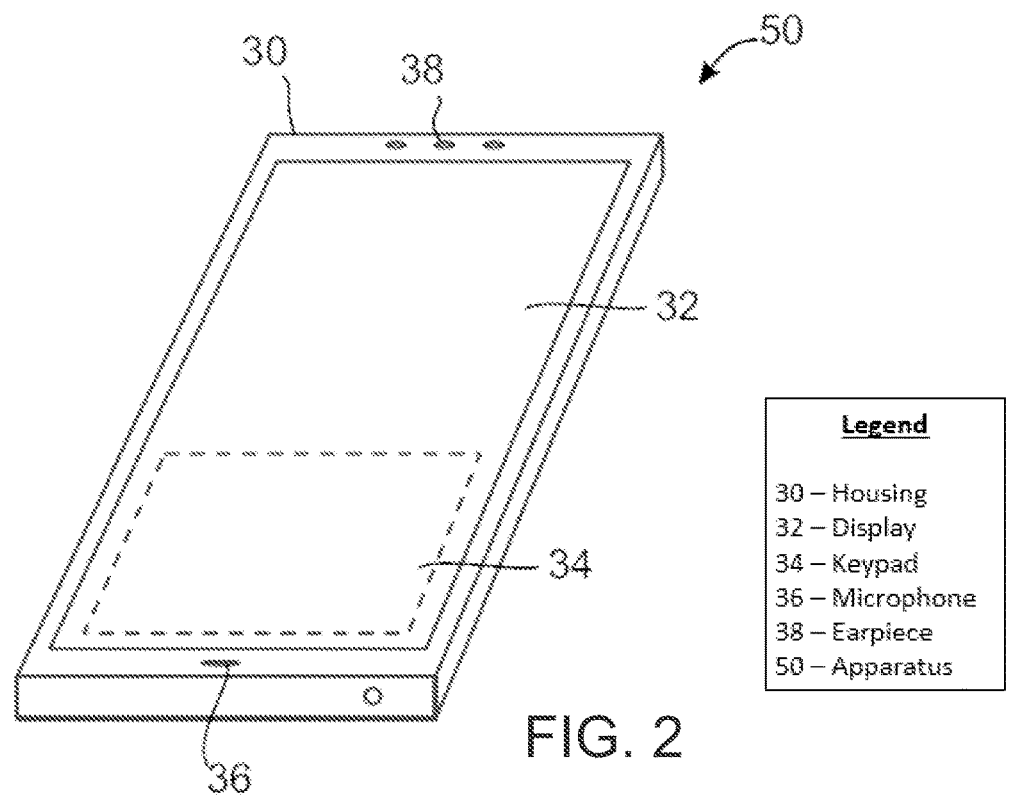
FIG. 2 shows schematically a layout of an apparatus according to an example embodiment.

In this regard, reference is first made to FIGS. 1 and 2, where FIG. 1 shows a schematic block diagram of an exemplary apparatus or electronic device 50, which may incorporate the arrangement according to the embodiments. FIG. 2 shows a layout of an apparatus according to an example embodiment. The elements of FIGS. 1 and 2 will be explained next.

The electronic device 50 may for example be a mobile terminal or user equipment of a wireless communication system. The apparatus 50 may comprise a housing 30 for incorporating and protecting the device. The apparatus 50 further may comprise a display 32 and a keypad 34. Instead of the keypad, the user interface may be implemented as a virtual keyboard or data entry system as part of a touch-sensitive display.

The apparatus may comprise a microphone 36 or any suitable audio input which may be a digital or analogue signal input. The apparatus 50 may further comprise an audio output device, such as anyone of: an earpiece 38, speaker, or an analogue audio or digital audio output connection. The apparatus 50 may also comprise a battery 40 (or the device may be powered by any suitable mobile energy device such as solar cell, fuel cell or clockwork generator). The apparatus may further comprise a camera 42 capable of recording or capturing images and/or video. The apparatus 50 may further comprise an infrared port 41 for short range line of sight communication to other devices. In other embodiments the apparatus 50 may further comprise any suitable short-range communication solution such as for example a Bluetooth wireless connection or a USB/firewire wired connection.

The apparatus 50 may comprise a controller 56 or processor for controlling the apparatus 50. The controller 56 may be connected to memory 58 which may store both user data and instructions for implementation on the controller 56. The memory may be random access memory (RAM) and/or read only memory (ROM). The memory may store computer-readable, computer-executable software including instructions that, when executed, cause the controller/processor to perform various functions described herein. In some cases, the software may not be directly executable by the processor but may cause a computer (e.g., when compiled and executed) to perform functions described herein. The controller 56 may further be connected to codec circuitry 54 suitable for carrying out coding and decoding of audio and/or video data or assisting in coding and decoding carried out by the controller.

The apparatus 50 may comprise radio interface circuitry 52 connected to the controller and suitable for generating wireless communication signals for example for communication with a cellular communications network, a wireless communications system or a wireless local area network. The apparatus 50 may further comprise an antenna 44 connected to the radio interface circuitry 52 for transmitting radio frequency signals generated at the radio interface circuitry 52 to other apparatus(es) and for receiving radio frequency signals from other apparatus(es).

In the following, different exemplifying embodiments will be described using, as an example of an access architecture to which the embodiments may be applied, a radio access architecture based on Long Term Evolution Advanced (LTE Advanced, LTE-A) or new radio (NR, 5G), without restricting the embodiments to such an architecture, however. A person skilled in the art appreciates that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet protocol multimedia subsystems (IMS) or any combination thereof.

FIG. 3 depicts examples of simplified system architectures only showing some elements and functional entities, all being logical units, whose implementation may differ from what is shown. The connections shown in FIG. 3 are logical connections; the actual physical connections may be different. It is apparent to a person skilled in the art that the system typically comprises also other functions and structures than those shown in FIG. 3. The embodiments are not, however, restricted to the system given as an example but a person skilled in the art may apply the solution to other communication systems provided with necessary properties.

The example of FIG. 3 shows a part of an exemplifying radio access network.

FIG. 3 shows user devices 300 and 302 configured to be in a wireless connection on one or more communication channels in a cell with an access node (such as (e/g)NodeB) 304 providing the cell. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc. entity suitable for such a usage.

A communication system typically comprises more than one (e/g)NodeB in which case the (e/g)NodeBs may also be configured to communicate with one another over links, wired or wireless, designed for the purpose. These links may be used for signaling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 310 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc. The CN may comprise network entities or nodes that may be referred to management entities. Examples of the network entities comprise at least an Access and Mobility Management Function (AMF).

The user device (also called a user equipment (UE), a user terminal, a terminal device, a wireless device, a mobile station (MS) etc.) illustrates one type of an apparatus to which resources on the air interface are allocated and assigned, and thus any feature described herein with a user device may be implemented with a corresponding network apparatus, such as a relay node, an eNB, and an gNB. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. Accordingly, the user device may be an IoT-device. The user device may also utilize cloud. In some applications, a user device may comprise a small portable device with radio parts (such as a watch, earphones or eyeglasses) and the computation is carried out in the cloud. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. The access nodes of the radio network form transmission/reception (TX/Rx) points (TRPs), and the UEs are expected to access networks of at least partly overlapping multi-TRPs, such as macro-cells, small cells, pico-cells, femto-cells, remote radio heads, relay nodes, etc. The access nodes may be provided with Massive MIMO antennas, i.e. very large antenna array consisting of e.g. tens or hundreds of antenna elements, implemented in a single antenna panel or in a plurality of antenna panels, capable of using a plurality of simultaneous radio beams for communication with the UE. The UEs may be provided with MIMO antennas having an antenna array consisting of plurality of antenna elements a.k.a. patches, implemented in a single antenna panel or in a plurality of antenna panels. Thus, the UE may access one TRP using one beam, one TRP using a plurality of beams, a plurality of TRPs using one (common) beam or a plurality of TRPs using a plurality of beams.

5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also capable of being integrated with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 312, or utilize services provided by them. The communication network may also be able to support the usage of cloud services, for example at least part of core network operations may be carried out as a cloud service (this is depicted in FIG. 3 by "cloud" 314). The communication system may also comprise a central control entity, or a like, providing facilities for networks of different operators to cooperate for example in spectrum sharing.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU) and non-real time functions being carried out in a centralized manner (in a centralized unit, CU 308).

It should also be understood that the distribution of labor between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well. The gNB is a next generation Node B (or, new Node B) supporting the 5G network (i.e., the NR).

5G may also utilize non-terrestrial nodes 306, e.g. access nodes, to enhance or complement the coverage of 5G service, for example by providing backhauling, wireless access to wireless devices, service continuity for machine-to-machine (M2M) communication, service continuity for Internet of Things (IoT) devices, service continuity for passengers on board of vehicles, ensuring service availability for critical communications and/or ensuring service availability for future railway/maritime/aeronautical communications. The non-terrestrial nodes may have fixed positions with respect to the Earth surface or the non-terrestrial nodes may be mobile non-terrestrial nodes that may move with respect to the Earth surface. The non-terrestrial nodes may comprise satellites and/or HAPSs. Satellite communication may utilize geostationary earth orbit (GEO) satellite systems, but also low earth orbit (LEO) satellite systems, in particular mega-constellations (systems in which hundreds of (nano)satellites are deployed). Each satellite in the mega-constellation may cover several satellite-enabled network entities that create on-ground cells. The on-ground cells may be created through an on-ground relay node 304 or by a gNB located on-ground or in a satellite.

A person skilled in the art appreciates that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

Frequency bands for 5G NR are separated into two frequency ranges: Frequency Range 1 (FR1) including sub-6 GHz frequency bands, i.e. bands traditionally used by previous standards, but also new bands extended to cover potential new spectrum offerings from 410 MHz to 7125 MHz, and Frequency Range 2 (FR2) including frequency bands from 24.25 GHz to 52.6 GHz. Thus, FR2 includes the bands in the mmWave range, which due to their shorter range and higher available bandwidth require somewhat different approach in radio resource management compared to bands in the FR1.

MIMO is one of the key enabling techniques for 5G wireless technology. The underlying principle of MIMO is to use multiple transmit and receive antennas to increase throughput and/or reliability of data transmission. Increased throughput can be achieved by transmitting/receiving different data streams over multiple antennas, while increased reliability can be achieved by using multiple antennas for transmitting/receiving multiple versions of the same data.

Beamforming antenna arrays play an important role in 5G implementations. Although offering high bandwidth, mmWave frequencies have higher propagation losses that greatly vary depending on the environment. Smaller wavelength at higher carrier frequencies allow smaller antenna element sizes which gives an opportunity to place one or more (for example, two, three or more) relatively large antenna arrays at a UE. This in turn leads to various challenges to maintain the expected performance.

Considering as a non-limiting example 2×2 MIMO, downlink (DL) MIMO performance (for example, in mmWave frequency ranges, such as FR2) may be achieved by using polarization split (co-polar and cross-polar) of a dual feed antenna array at a base station (referred to also as a gNB in the following) and/or at a UE, where each polarization corresponds to one MIMO branch. The reasoning behind this approach is to achieve high and similar antenna gain performance in both MIMO channels, while maintaining a compact spatial antenna design.

When designing dual-polarized antenna arrays, it is important to achieve high Cross Polarization Discrimination (XPD). XPD may be defined as a ratio of the co-polar component of the specified polarization and the orthogonal cross-polar component over a sector or beamwidth angle.

De-correlation at an antenna array may be obtained by ensuring that each antenna feed corresponds to a single polarization and that the resulting dual feed polarizations are designed to be orthogonal. This way, an antenna array with high XPD at the feed points may be designed. This approach will ensure full utilization of two MIMO channels for Line of Sight (LoS) and/or Non-Line of Sight (NLoS) operation provided that the maximum gain direction and the orientation of the orthogonal polarizations are aligned between antenna arrays at UE and at gNB.

In addition, high antenna gain requirements for mmWave (e.g. FR2) frequencies will reduce its radiation beam width, whereby beam steering at an antenna array (or arrays) is required to cover the needed angular space. The beam steering capabilities may be implemented using tunable phase shifters at each element in the antenna array, whereby the direction of the beam can be controlled electrically (phased array) instead of mechanically.

The XPD of any antenna (or antenna array) depends on its radiation pattern and may change dynamically as a function of the Angle of Departure (AoD) and/or Angle of Arrival (AoA). This dependency increases as the variations in the radiation pattern change and as the radiation patterns change electrically. Higher antenna gain pattern leads to larger XPD variations over the angular space. Phase controlled arrays also have increased XPD variations over the angular space.

As such, the physical orientation of antennas at mmWave frequencies will affect MIMO throughout much more than what is seen at Sub6 GHz frequencies, where the decorrelation at the UE is achieved by physical separation between two receiving antennas (each with random and different radiation pattern). Instead, the mmWave architecture may utilize dual orthogonally polarized antennas (or antenna arrays), designed for equal high gain radiation patterns.

MIMO rank is a metric that can be used for indicating how much multipath the channel offers. It indicates how many streams can be transmitted via the channel. For example, in a 2×2 MIMO system, the rank can be 1 or 2, and in a 4×4 MIMO system, the rank can be 1, 2, 3 or 4.

FIGS. 4a and 4b illustrate polarization alignment and/or misalignment. Arrows with solid lines in the figure show orthogonal polarizations of the antenna array at the UE, while dotted lines show polarizations of the incoming MIMO signal. The aligned case (FIG. 4a) on the left will result in a high XPD while the misaligned case (FIG. 4b) on the right will result in a low XPD. The former case (FIG. 4a) may result in MIMO rank 2, while the latter case (FIG. 4b) may result in MIMO rank 1 as measured and/or reported (e.g. by means of rank indicator, RI) by the UE, although it is configured to communicate with an access point (e.g. a gNB) using 2×2 MIMO. The MIMO throughput can therefore be reduced by a factor of up to two when the high XPD is lost at the UE, since it will be more difficult or even impossible to distinguish the two MIMO channels from each other, as they are mixed at both receive chains and not each received separately on the two receive chains. The MIMO might thus not be achieved with an expected quality in many of these cases and the communication may be carried out as if no MIMO was in use.

Thus, the XPD of an antenna array may depend on angle of arrival (AoA) and the orientation (that is, an alignment) of the incoming orthogonal MIMO signals. For considered dual-polarized antenna, the highest XPD can be achieved for perfectly aligned incoming orthogonal 2×2 MIMO signal, while 450 offset in alignment will lead to lowest XPD.

Various experiments have shown dependency between AoA, polarization alignment and XPD. In addition, the XPD of the two feed points (co-polarized and cross-polarized) of the UE antenna array may also vary independently, even for the same AoA, and both antenna array feed points must have sufficiently high XPD to obtain an overall high MIMO rank. The two feed points of the antenna array may be affected differently by non-optimal surrounding environment where the antenna array is mounted, especially from the chassis and glass of a UE. This will generate different radiation patterns, even with the same antenna array weights (power and phase) and thereby directly affect the XPD.

Figure 5A:
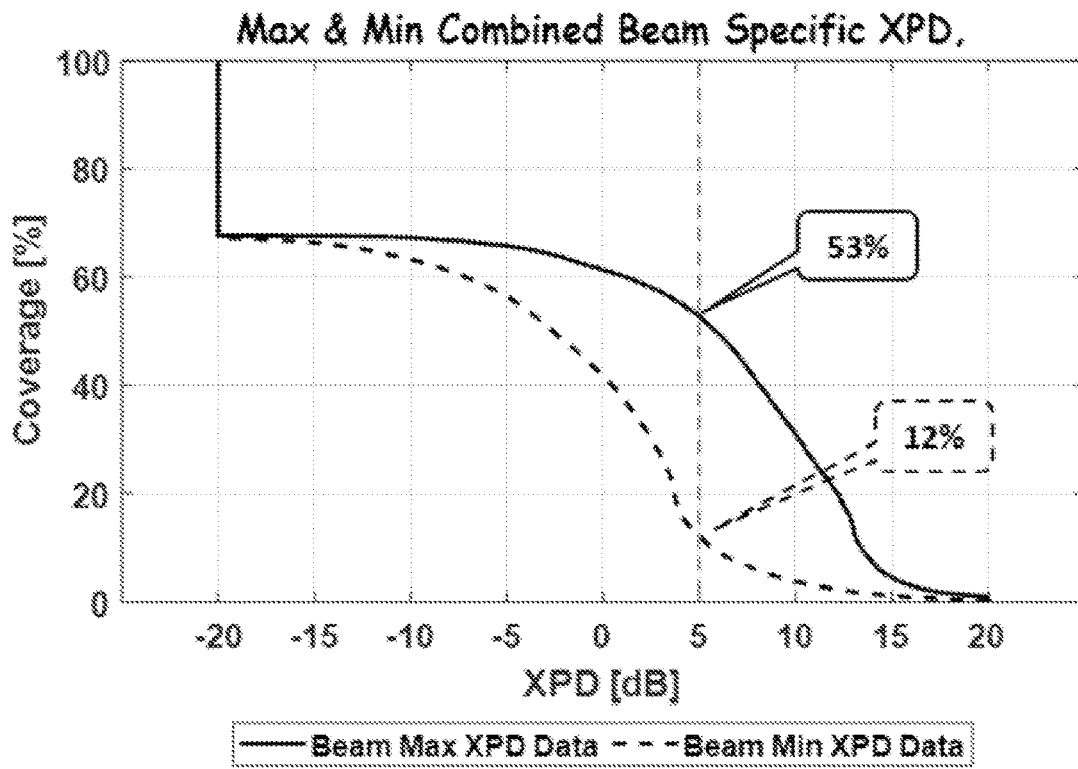
FIGS. 5a and 5b illustrate examples of XPD variations depending on polarization alignment.
Figure 5B:
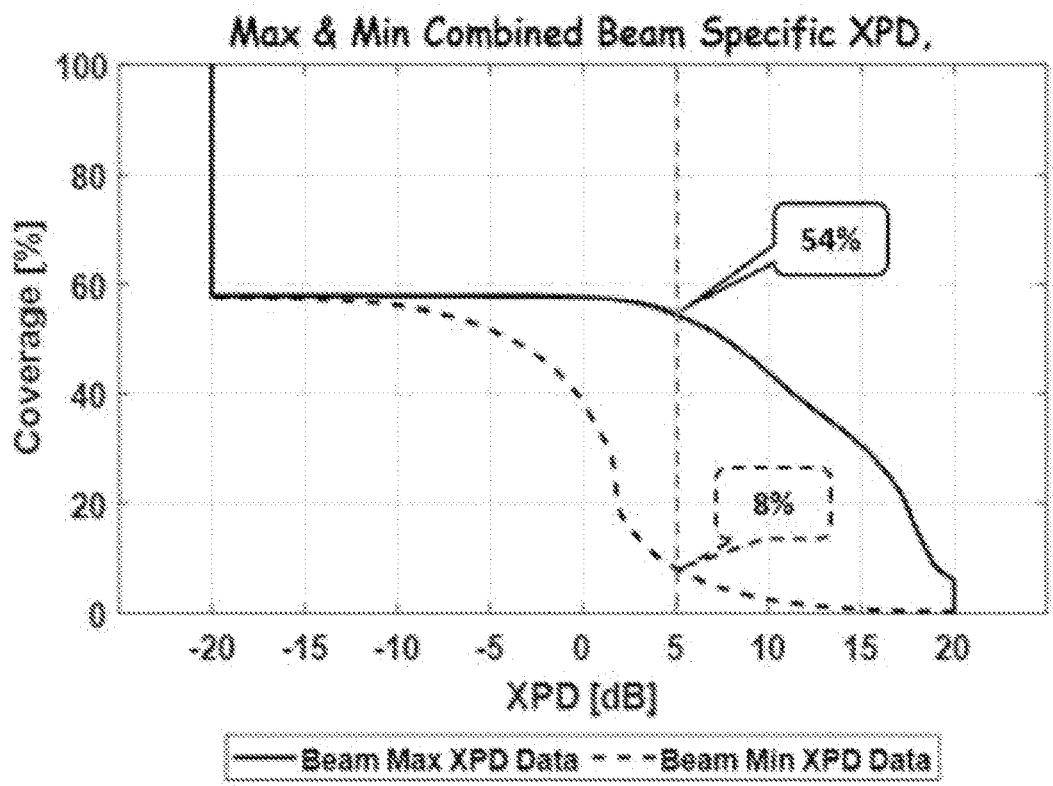

FIGS. 5a and 5b illustrate XPD variations depending on the alignment of an antenna array with an incoming MIMO signal. The maximum XPD is simulated for perfectly aligned incoming orthogonal 2×2 MIMO signal, while minimum XPD is simulated with a 45° offset in alignment. The results are shown for different AoA's, where XPD values larger than 20 dB have been truncated to 20 dB, and values less than −20 dB have been truncated to −20 dB. Furthermore, XPD values for angular directions where the gain is 10 dB less that the maximum antenna gain have also been truncated to −20 dB. FIG. 5a shows the maximum and minimum XPD for the first polarization (co-polarized) of the UE antenna array, while FIG. 5b shows the XPD values for the second polarization (cross-polarized).

XPD values larger than 5 dB (which are considered as the minimum XPD value for reasonable MIMO performance in this example, but other values can also be considered depending on the MIMO capabilities of the device) is achieved for 50% of the full angular space by a single antenna array when the array is perfectly aligned with the incoming orthogonal MIMO signal. This number drops to around 10% for the misaligned case with minimum XPD values Furthermore, the XPD needs to be sufficiently high (such as better than 5 dB) for both feed points (co-polarized and cross-polarized) on the UE antenna array at a specific angular direction, to ensure sufficient MIMO (rank 2 in this case) performance and this is only achieved for approximately 46% of the angular space for perfect alignment and below 1% for worst-case misalignment. Increasing the number of antenna arrays may also increase XPD coverage values by approximately a multiplication factor equal to the number of antenna arrays. As such, a UE with three antenna arrays (current 3GPP working assumption) could in theory (assuming limited overlap between the different radiation patterns) achieve a full XPD coverage when the incoming orthogonal MIMO signal is perfectly aligned with the antenna array at the UE, but it may still be very low (sometimes even below 1%) for misaligned cases. It is evident that a typical phased antenna array, which will typically be implemented on a smart phone will have a limited angular space where it can actually receive a 2×2 DL orthogonal MIMO signal with the needed decorrelation (for example, resulting in at least 5 dB XPD) between the two feed points, even if the UE is in LoS of the gNB and have potential optimal reception conditions.

As such, best MIMO performance might not always be obtained by using one dual feed antenna array at the UE with similarly aligned antenna elements.

As a first aspect for at least alleviating the above problems, an apparatus is herein introduced, said apparatus comprising: an antenna array comprising a plurality of antenna elements configured for receiving multiple input multiple output (MIMO) signals, wherein the antenna array comprises at least a first subpart of the antenna array comprising a first subsection of the plurality of antenna elements; and a second subpart of the antenna array comprising a second subsection of the plurality of antenna elements, wherein an alignment of the antenna elements in the second subpart deviates substantially by 30°-60° from an alignment of the antenna elements in the first subpart.

Thus, the antenna array comprising at least two subparts with antenna elements having a significant deviation of alignment between the subparts enables to control either of the first and the second subpart to be used when sufficiently high MIMO performance, such as MIMO Rank 2, is supported by the downlink channel, wherein selecting among the first and the second subpart to be used may be carried out based on which alignment suits better for the incoming orthogonal MiMo signal. On the other hand, when lower MIMO performance, such as MIMO Rank 1, is supported by the downlink channel, the requirements for the alignment of the antenna elements are less strict, and thereupon all or both (first and second) subparts of the antenna array, i.e. a full array, may be used for downlink channel reception, thereby enabling maximum gain in the reception.

In the following, "the alignment" of antenna elements may refer to either alignment of the antenna elements on the surface of the antenna array or rotation of an antenna element around an axis perpendicular to the surface of the antenna element, or both.

Figure 6:
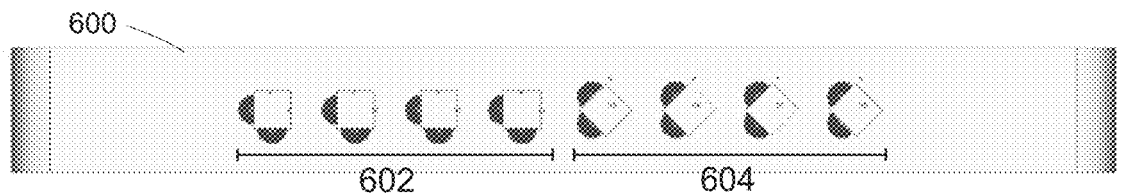
FIG. 6 shows a schematic block diagram of an antenna array arrangement according to an embodiment.

FIG. 6 shows a simplified example of such an antenna array according to an embodiment. FIG. 6 shows a 1×8 antenna array 600, i.e. an antenna array having 8 antenna elements in one row, configured for receiving MIMO signals. The antenna array 600 comprises a first subpart 602 of the antenna array comprising a first subsection of the plurality of antenna elements, i.e. the four leftmost antenna elements in the row. The antenna array 600 also comprises a second subpart 604 of the antenna array comprising a second subsection of the plurality of antenna elements i.e. the four rightmost antenna elements in the row. The alignment of the antenna elements in the second subpart is shown as deviating substantially from the alignment of the antenna elements in the first subpart.

According to an embodiment, the alignment of the antenna elements in the second subpart deviates substantially by 45° from the alignment of the antenna elements in the first subpart.

The lowest XPD results at least in theory when the polarizations of the antenna array and the incoming MIMO signal are misaligned substantially by 45°, as shown in FIG. 4*b*. Thus, in theory the optimal deviation of the alignment of the antenna elements in the subparts is likewise substantially 45°. It is nevertheless noted that the antenna array is typically fixed to the apparatus, such as the UE, and when using the UE, the alignment of the UE and thereby the alignment of the antenna array inevitably at least slightly variates, e.g. when the UE rotates when held in hand or carried along when moving. Accordingly, while it may be assumed that the deviation of the alignment of the antenna elements of substantially 450 between the subparts, as shown in FIG. 6, may provide the optimal results, if the surrounding conditions remain the same, in practical use a wider range of angles in the deviation of the alignment of the antenna elements, such as 30°-60°, may provide at least nearly as good results.

According to an embodiment, the antenna elements of the first subpart are adjacent to each other and the antenna elements of the second subpart are adjacent to each other.

Thus, there may be a clear division of the antenna elements of the antenna array into at least two subparts, each subpart consisting of antenna elements adjacent to each other. Such arrangement is disclosed in FIG. 6, where the first subpart 602 of the antenna array comprises the four leftmost antenna elements adjacent to each other, and the second subpart 604 of the antenna array comprising the four rightmost antenna elements adjacent to other, correspondingly. Such arrangement may decrease the maximum gain by around 3 dB for each of the sub-sections, but may have suppressed side-lobes, such as 10-15 dB for the first side lobes.

According to an embodiment, the antenna elements of the first subpart are at least partly interleaved with the antenna elements of the second subpart.

Hence, the antenna elements may be arranged, for example, such that every second of the antenna elements are aligned in the first direction, forming the first subpart of the antenna array, and the alternate ones of the antenna elements are aligned in the second direction, forming the second subpart of the antenna array and deviating substantially by 30°-60° from the alignment of the antenna elements in the first subpart. For example, in the antenna array of FIG. 6, the first, third, fifth and seventh antenna element may be aligned in the first direction (not shown) and form the first subpart of the antenna array, whereas the second, fourth, sixth and eighth antenna element may be aligned in the second direction deviating substantially by 30°-60° from the alignment of the antenna elements in the first subpart (not shown) and form the second subpart of the antenna array. The interleaved embodiment may have almost the same maximum gain as utilizing the full array, but with increased side lobe level, such as 5-10 dB for the first side-lobe level.

It may also be possible that the antenna elements of the subparts of the antenna array are only partly interleaved with each other. For example, in the antenna array of FIG. 6, the first, second, fourth, sixth antenna element may be aligned in the first direction (not shown) and form the first subpart of the antenna array, whereas the third, fifth, seventh and eighth antenna element may be aligned in the second direction deviating substantially by 30°-60° from the alignment of the antenna elements in the first subpart (not shown) and form the second subpart of the antenna array.

The obtained MIMO performance (which can be defined for example by MIMO rank, a parameter identifying MIMO rank, or any other suitable quality metric or metrics) will depend on the channel conditions, but it may also depend on the XPD of the receiving antenna at the UE. The UE cannot directly affect the channel conditions, but it can affect the way it experiences the current channel conditions by how it chooses to configure its antenna array and the subparts of it and thereby directly affect the obtained MIMO rank of the incoming signal.

In the following, an enhanced method for controlling the operation of the apparatus provided with the above antenna array will be described in more detail, in accordance with various embodiments. The embodiments as described herein therefore address the above-mentioned challenges by providing improvements which enable more efficient operation of wireless communication network. For instance, the embodiments may optimize MIMO performance depending on the environment. Thus, for example, the embodiments may enable dynamic optimization of MIMO performance as the environment changes or the UE rotates, by changing the orientation of the orthogonality of the receiving antenna elements.

Figure 7:
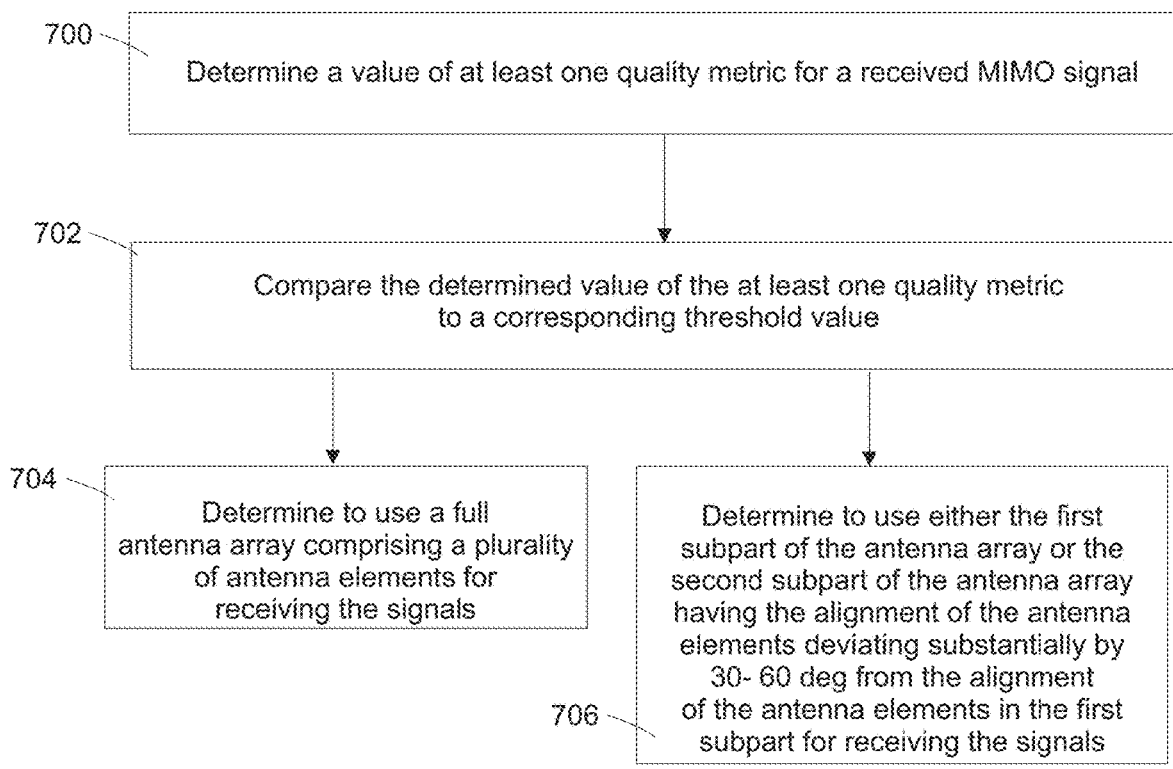
FIG. 7 shows a flow chart of a method according to an embodiment.

The method, which is disclosed in flow chart of FIG. 7 as reflecting the operation of a terminal apparatus, for example a user equipment (UE), comprising an antenna array according to the first aspect above, wherein the method comprises determining (700) a value of at least one quality metric for a received multiple input multiple output (MIMO) signal; comparing (702) the determined value of the at least one quality metric to a corresponding threshold value; and determining, based on the result of the comparison of the value of the at least one quality metric, whether to use (704) a full antenna array comprising a plurality of antenna elements for receiving the signals or use (706) either the first subpart of the antenna array or the second subpart of the antenna array having the alignment of the antenna elements deviating substantially by 30°-60° from the alignment of the antenna elements in the first subpart for receiving the signals.

The method disclosed in FIG. 7 describes the basic idea for controlling the operation of the antenna array as depicted above. The full array and thereby also the maximum gain may be used, when operating in lower MIMO performance, such as MIMO Rank 1, since the orientation of the device, and thus that of the antenna array, is not important for the obtained performance. However, when the channel supports higher MIMO performance, such as MIMO Rank 2, and MiMo is configured by the gNB, only one subpart of the antenna array may be used, depending on which alignment provides the better performance for the incoming orthogonal MiMo signal.

The apparatus may continually monitor the value of the at least one quality metric, and adjust the usage among the full antenna array, the first subpart and the second subpart of the antenna array according to the changes of the value of the at least one quality metric in comparison to their corresponding thresholds.

Figure 8:
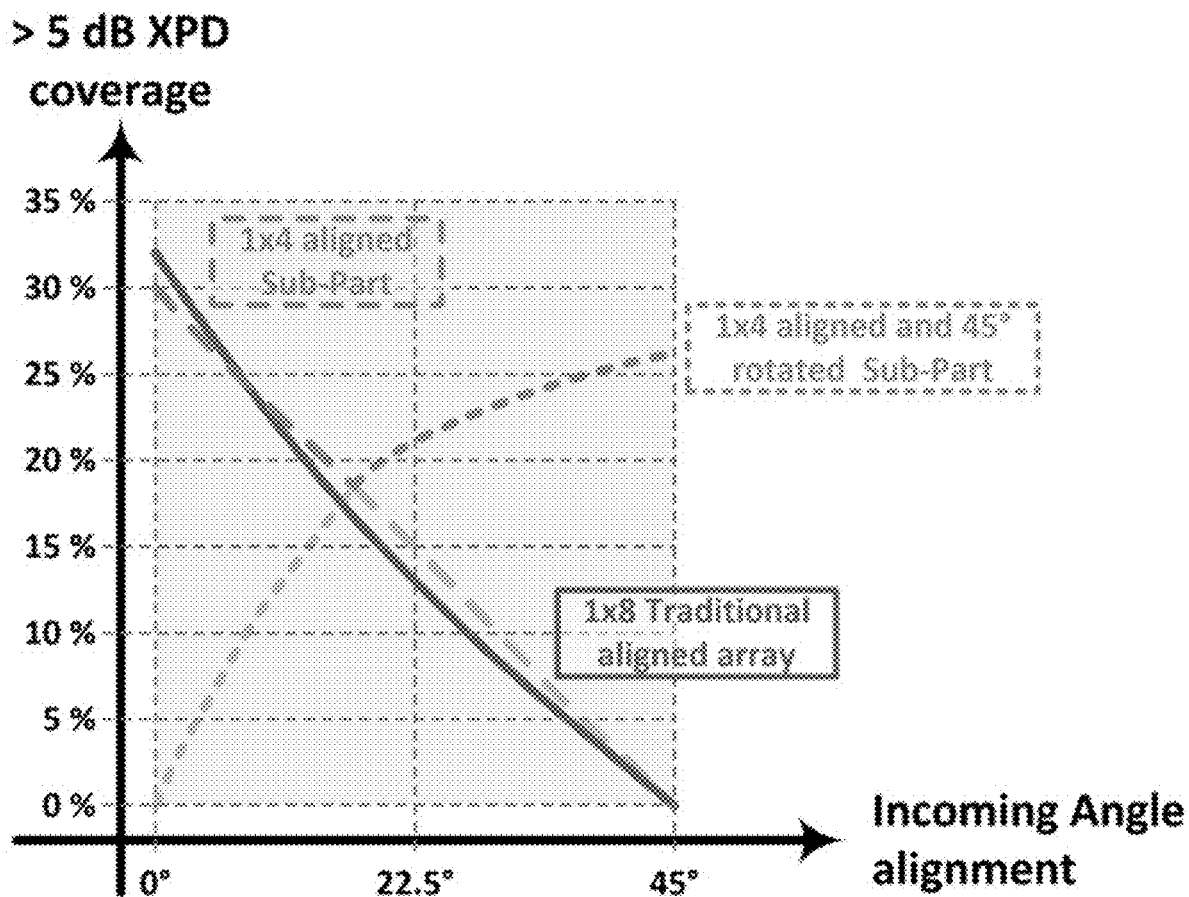
FIG. 8 shows examples of XPD variations in the usage of the antenna array arrangement according to an embodiment.

The improvement provided by the now introduced antenna array implementation is illustrated in FIG. 8, which shows the XPD performance improvement as a function of the angle of the incoming orthogonal MiMO signal. The solid curve represents the XPD coverage of a traditional array 1×8 with similarly aligned antenna elements and shows that the minimum XPD coverage (>5 dB) gradually decreases as a function of the growing alignment angle of the incoming orthogonal MiMo signal. The long-dashed curve represents the XPD coverage of the novel first subpart array 1×4 with antenna elements aligned similarly to the traditional array 1×8 and shows that the minimum XPD coverage of the first subpart array 1×4 decreases approximately similarly to the traditional array 1×8. The short-dashed curve represents the XPD coverage of the novel second subpart array 1×4 with antenna elements aligned with a 450 rotation to the traditional array 1×8 and shows that the minimum XPD coverage of the second subpart array 1×4 starts substantially from zero and increases as a function of the growing alignment angle of the incoming orthogonal MiMo signal.

Considering a situation where the downlink channel supports a higher MIMO performance, such as MIMO Rank 2, and the alignment angle of the incoming orthogonal MiMo signal in respect to the antenna array is rather small, such as <15° in the example of FIG. 8, the apparatus configures the first subpart array 1×4 with antenna elements aligned similarly to the traditional array 1×8 to be used. However, when the alignment angle of the incoming orthogonal MiMo signal in respect to the antenna array increases, the minimum XPD coverage (>5 dB) of the first subpart array also gradually decreases until there appears an intersection of the decreasing XPD coverage of the first subpart array and the increasing XPD coverage of the second subpart array. In the example of FIG. 8, the intersection appears approximately at 17°-19° of the alignment angle of the incoming orthogonal MiMo signal in respect to the antenna array. Thereupon, the apparatus configures the second subpart array 1×4 with antenna elements aligned with a 45° rotation to the traditional array 1×8 to be used.

It can be seen from FIG. 8 that the combined XPD coverage performance of the first and second subparts of antenna array (the best values of the long-dashed and short-dashed curves) is significant better and never drops below 18% coverage in the example of FIG. 8. In comparison to the traditional array 1×8 with similarly aligned antenna elements (solid curve), the example of FIG. 8 shows that minimum XPD (>5 dB) coverage value is increased from below 1% to approximately 18% and that the overall coverage above an XPD greater than 5 dB is improved by approximately 50%, which is represented by the area of below the combined two subpart array curves being approximately twice as big as the area covered by the solid curve alone.

Consequently, the introduced antenna array implementation will have a significant improvement on the MiMo performance on a handheld device operating in a dynamic environment where the alignment between the incoming orthogonal MiMo signal and the polarization of the antenna array will be random.

Figure 9:
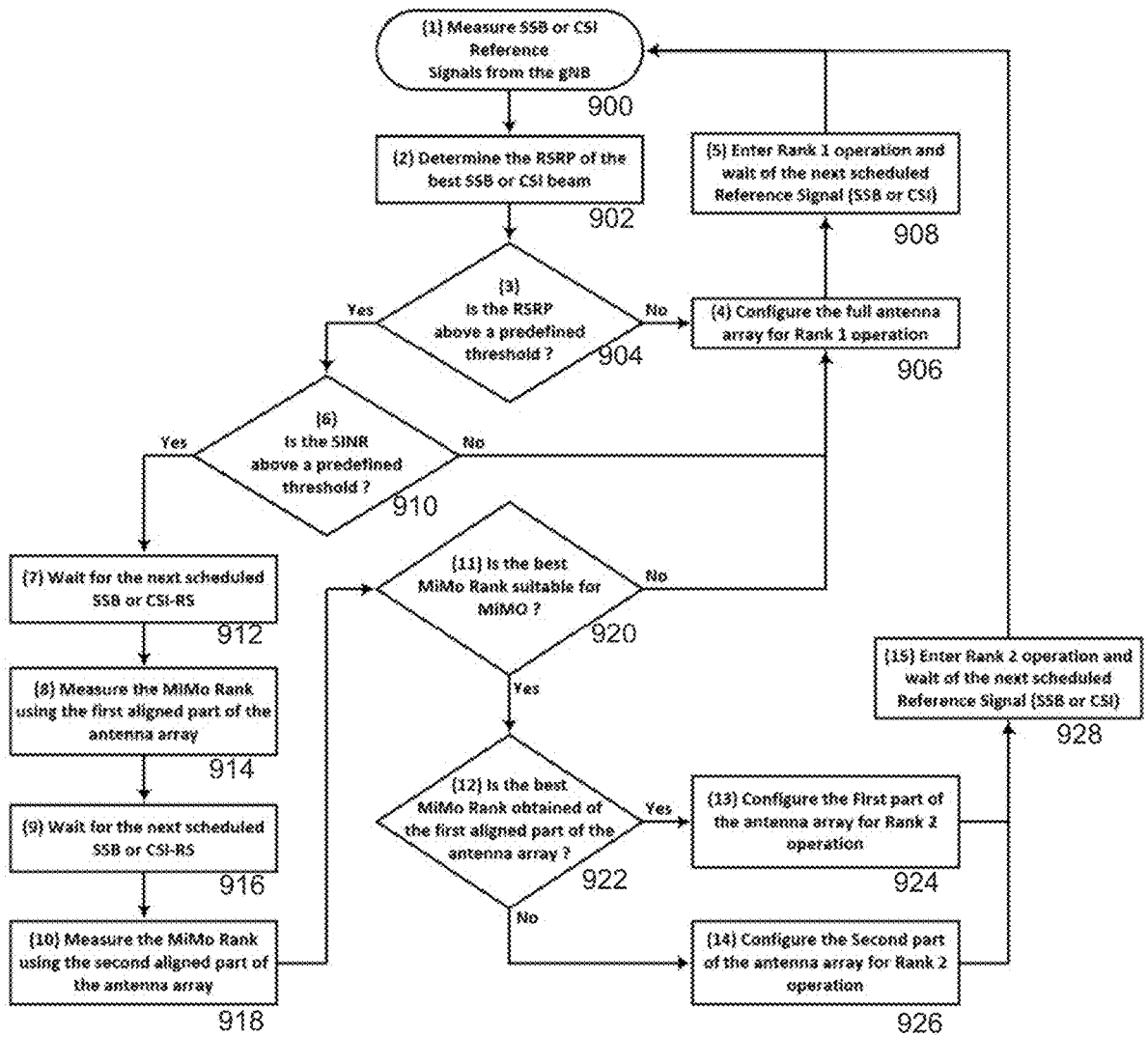
FIG. 9 illustrates an exemplary flow chart in accordance with at least some embodiments.

The antenna array configuration procedure carried out by the apparatus, such as the UE, and various embodiments related thereto is now described more in detail with reference to the flow chart of FIG. 9. It is noted that the steps of FIG. 9 may performed in a variety of subsets, at least partly in parallel and/or at least partly in revised order.

According to an embodiment, the at least one quality metric comprises a first quality metric of a reference signal received power (RSRP) and a second quality metric of signal-to-interference and noise ratio (SINR), wherein said means for determining is configured to control, in response to either the value of the first quality metric or the second quality metric being below the corresponding threshold value, the apparatus to use the full antenna array for receiving the signals.

Thus, the antenna array configuration procedure may start by determining one or more quality metrics from a reference signal received from a gNB, and if said one or more quality metrics, such as RSRP or SINR, is below their corresponding threshold value, it may immediately indicate that the apparatus should use the full antenna array for receiving the signals, since the UE is in bad radio conditions and will need to utilize the full array and thereby the maximum achievable antenna gain.

In FIG. 9, a possible implementation is depicted as the UE receiving (900) scheduled SSB (Synchronization Signal Block) or CSI (Channel State Information) reference signals sent from the gNB, whereupon the UE determines (902) the RSRP of the best SSB or CSI beam. The UE determines (904) if the RSRP of the best SSB/CSI beam is higher than a predetermined threshold, and if not, the UE configures (906) the full antenna array to be used for MiMo Rank 1 operation. The UE enters (908) Rank 1 operation and remains waiting for the next scheduled and usable reference signal (SSB, CSI or any other suitable reference signal).

If the RSRP of the best SSB/CSI beam in step 904 is higher than the predetermined threshold, the UE determines (910) if the SINR of the best SSB/CSI beam is higher than a predetermined threshold. Again, if not, the UE configures (906) the full antenna array to be used for MiMo Rank 1 operation. If yes, the UE waits (912) for the next scheduled reference signal, such as SSB, CSI-RS, demodulation reference signal (DMRS) or any other suitable reference signal.

According to an embodiment, the at least one quality metric comprises a third quality metric for determining a MIMO performance of a channel matrix for downlink transmission. Thus, the UE determines the invertibility of the channel matrix in order to determine the type of MIMO downlink transmission to be used.

According to an embodiment, the third quality metric is at least one of the following: a MIMO rank, a matrix determinant, a condition number, singular values, eigenvalues.

Hence, various metrics can be used for determining the invertibility of the channel matrix. Instead of or in addition to MIMO rank, a matrix determinant of the MIMO channel matrix can be used for measuring the orthogonality and the channel quality. Similarly, singular values or (inverse) eigenvalues may be calculated based on the MIMO channel matrix. These may further be utilized in calculating a condition number. Naturally, any metric that qualifies the invertibility of the MiMo channel matrix may be used.

It is also possible to use averages of this values, or any filtered version value could also be used, such as sliding window, finite impulse response filter, infinite impulse response filter or any order (1, 2, . . . , $n_{th}$ order). It is noted that the frequency average of the channel estimates of the MiMo channel, such as narrow band on single subcarrier DMRS or full-blown bandwidth allocated to UE, should preferably be taken into consideration with the different averaging techniques.

In the following, "MIMO rank" may be used interchangeably with the terms "third quality metric for determining a MIMO performance" and/or "MIMO performance". It is noted that in such context, any of the above-mentioned alternatives for the third quality metric may be used instead.

According to an embodiment, the apparatus comprises means for measuring at least a MIMO performance of the first subpart of the antenna array and a MIMO performance of the second subpart of the antenna array.

Thus, the apparatus is configured to measure the MIMO performance of subparts of the antenna array separately. For this purpose, typically at least two reference signals need to be received: one for the MIMO performance measurement of the first subpart and another for the MIMO performance measurement of the second subpart.

According to an embodiment, the MIMO performance of the subparts are configured to be measured in response to the value of the first quality metric and the second quality metric being at least equal to the corresponding threshold value.

Hence, if the measurements of the first and second quality metrics, such as RSRP or SINR, indicate that the quality of the received reference signal is not sufficient, the apparatus configures the full antenna array to be used, typically in MiMo Rank 1 operation. In such situation, the MIMO performance measurements of the first and the second subpart need not to be performed until a new reference signal with sufficient quality according to the first and second quality metrics is received.

According to an embodiment, the apparatus comprises means for determining a best value among the MIMO performance values of the at least first subpart and the second subpart of the antenna array; means for comparing the best MIMO value to a corresponding threshold value; and means for controlling, in response to the best MIMO value being at least equal to the corresponding threshold value, the subpart of the antenna array having the best MIMO value to be used for receiving the signals according to MIMO full Rank operation.

Thus, among the MIMO performance values of the subparts of the antenna array, the best MIMO performance value is determined and compared to a threshold value, and if the best MIMO performance value is sufficiently good in comparison to the threshold value, the subpart of the antenna array having the best MIMO value is controlled to be used for receiving the signals. Herein, the subpart of the antenna array may be controlled to operate according to MIMO full Rank operation, which e.g. in 2×2 MIMO configuration means Rank 2 or in 4×4 MIMO configuration means Rank 4.

According to an embodiment, said means for controlling is configured to control, in response to the best MIMO value being below to the corresponding threshold value, the apparatus to use the full antenna array for receiving the signals.

Hence, if the best MIMO performance value among the MIMO performance values of the subparts of the antenna array is not sufficiently good in comparison to the threshold value, the full antenna array is controlled to be used for receiving the signals. Herein, the full antenna array may be controlled to operate according to MIMO Rank 1 operation.

In FIG. 9, a possible implementation of the above embodiments is depicted as the UE measuring (914), based on the received reference signal (912), the MIMO performance, such as the MiMo Rank, of the first subpart of the antenna array. The UE receives (916) the next scheduled reference signal, and based on the received reference signal, the UE measures (918) the MIMO performance, such as the MiMo Rank, of the second subpart of the antenna array. Among the MIMO performance values of the subparts of the antenna array, the UE determines the best MIMO performance value and compares (920) the best value to a threshold value to determine if the best MIMO performance value, such as the MiMo Rank, is suitable for a higher Rank MiMo operation, i.e. if the best MIMO performance value is higher than the predetermined threshold, and if not, the UE configures (906) the full antenna array to be used for MiMo Rank 1 operation.

If the best MIMO performance value is higher than the predetermined threshold, the UE determines (922) which subpart of the antenna array has the best MIMO performance value and configures accordingly either the first subpart (924) or the second subpart (926) to be used for receiving the signals according to MIMO full Rank operation. The selected subpart enters (928) into the MIMO full Rank operation and remains waiting for the next reference signal.

The embodiments allow the optimization of the UE antenna array configuration, i.e. either of the subparts of the antenna array, to improve the MiMo throughput, when the orthogonal MiMo signal is arriving at an angular direction where the combined XPD of the dual polarized antenna array is insufficient for MiMo reception. Moreover, adapting the MiMo configuration of the subparts of the antenna array will lead to increased throughput and thereby better power utilization in the UE.

A typical UE with three antenna arrays will be able to align a beam (with less than 5 dB gain reduction from the maximum gain value) towards the angular direction of a LoS incoming orthogonal MiMo signal for more than 90% of the full angular space. However, the needed XPD (>5 dB) for MiMo reception will only be achieved for that angular space if the incoming orthogonal MiMo signal is perfectly aligned with the polarizations of the user antenna array. As a fact, MiMo reception might not be possible for any angular directions if the incoming orthogonal MiMo signal is misaligned by 45° relative to the polarizations of the user antenna array. As such, the UE will experience a drop in throughput by a factor up to 2 (such as from Rank 2 to Rank 1) that can be avoided by the embodiments as disclosed herein, thereby enabling to maintain at the full MiMo Rank.

The method and the embodiments related thereto may be implemented in an apparatus implementing a user equipment (UE). The apparatus may comprise at least one processor and at least one memory, said at least one memory stored with computer program code thereon, the at least one memory and the computer program code configured to, with the at least one processor, cause the apparatus at least to perform: determine a value of at least one quality metric for a received multiple input multiple output (MIMO) signal; compare the determined value of the at least one quality metric to a corresponding threshold value; and determine, based on the result of the comparison of the value of the at least one quality metric, whether to use a full antenna array comprising a plurality of antenna elements or either a first subpart of the antenna array comprising a first subsection of the plurality of antenna elements or a second subpart of the antenna array comprising a second subsection of the plurality of antenna elements, wherein an alignment of the antenna elements in the second subpart deviates substantially by 30°-60° from an alignment of the antenna elements in the first subpart for receiving the signals.

Such an apparatus may likewise comprise: an antenna array comprising a plurality of antenna elements configured for receiving multiple input multiple output (MIMO) signals, wherein the antenna array comprises at least a first subpart of the antenna array comprising a first subsection of the plurality of antenna elements; and a second subpart of the antenna array comprising a second subsection of the plurality of antenna elements, wherein an alignment of the antenna elements in the second subpart deviates substantially by 30°-60° from an alignment of the antenna elements in the first subpart.

Such apparatuses may comprise e.g. the functional units disclosed in any of the FIGS. 1, 2 and 3 for implementing the embodiments.

In an exemplary embodiment, a computer program may be configured to cause a method in accordance with the embodiments described above and any combination thereof. In an exemplary embodiment, a computer program product, embodied on a non-transitory computer readable medium, may be configured to control a processor to perform a process comprising the embodiments described above and any combination thereof.

In an exemplary embodiment, an apparatus, such as, a UE or gNB, may comprise at least one processor, and at least one memory including computer program code, wherein the at least one memory and the computer program code are configured to, with the at least one processor, cause the apparatus at least to perform the embodiments described above and any combination thereof.

In general, the various embodiments of the invention may be implemented in hardware or special purpose circuits or any combination thereof. While various aspects of the invention may be illustrated and described as block diagrams or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As used in this application, the term "circuitry" may refer to one or more or all of the following: (a) hardware-only circuit implementations, such as implementations in only analog and/or digital circuitry, and (b) combinations of hardware circuits and software, such as, as applicable: (i) a combination of analog and/or digital hardware circuit(s) with software/firmware and (ii) any portions of hardware processor(s) with software (including digital signal processor(s)), software, and memory(ies) that work together to cause an apparatus, such as UE or gNB, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Embodiments may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre stored design modules. Once the design for a semiconductor circuit has been completed, the resultant design, in a standardized electronic format (e.g., Opus, GDSII, or the like) may be transmitted to a semiconductor fabrication facility or "fab" for fabrication.

It is to be understood that the embodiments disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment. Thus, appearances of the phrases "in/according to one embodiment" or "in/according to an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and examples may be referred to herein along with alternatives for the various components thereof. It is understood that such embodiments, examples, and alternatives are not to be construed as de facto equivalents of one another, but are to be considered as separate and autonomous representations.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended examples. However, all such and similar modifications of the teachings of this invention will still fall within the scope of this invention.

ACRONYMS LIST

3GPP 3rd Generation Partnership Project
AoA Angle of Arrival
AoD Angle of Departure
ASIC Application-Specific Integrated Circuit
BS Base Station
CSI Channel State Information
CSI-RS Channel State Information Reference Signal
DMRS Demodulation Reference Signal
FPGA Field-Programmable Gate Array
GSM Global System for Mobile communication
HW Hardware
IoT Internet of Things
LoS Line of Sight
LTE Long-Term Evolution
MIMO Multiple Input Multiple Output
M2M Machine-to-Machine
NLoS Non-Line of Sight
NR New Radio
RAT Radio Access Technology
RAN Radio Access Node
UE User Equipment
XPD Cross Polarization Discrimination

The invention claimed is:

1. An apparatus, comprising:
an antenna array comprising a plurality of antenna elements configured for receiving multiple input multiple output (MIMO) signals at a frequency, wherein the antenna array comprises at least:
a first subpart of the antenna array comprising a first subsection of the plurality of antenna elements;
a second subpart of the antenna array comprising a second subsection of the plurality of antenna elements, wherein an alignment of the antenna elements in the second subpart deviates substantially by 30°-60° from an alignment of the antenna elements in the first subpart; and
circuitry configured to:
determine a value of at least one quality metric for a received multiple input multiple output (MIMO) signal;
compare the determined value of the at least one quality metric to a corresponding threshold value; and
determine, based on the result of the comparison of the value of the at least one quality metric, whether to use the full antenna array or either the first or the second subpart of the antenna array for receiving the signals at the frequency.

2. The apparatus according to claim 1, wherein the at least one quality metric comprises a first quality metric of a reference signal received power (RSRP) and a second quality metric of signal-to-interference and noise ratio (SINR), wherein
said circuitry is further configured to control, in response to either the value of the first quality metric or the second quality metric being below the corresponding threshold value, the apparatus to use the full antenna array for receiving the signals.

3. The apparatus according to claim 1, wherein the at least one quality metric comprises a third quality metric for determining a MIMO performance of a channel matrix for downlink transmission.

4. The apparatus according to claim 3, wherein the third quality metric is at least one of the following: a MIMO rank, a matrix determinant, a condition number, singular values, eigenvalues.

5. The apparatus according to claim 3, the circuitry being further configured to measure
at least a MIMO performance of the first subpart of the antenna array and a MIMO performance of the second subpart of the antenna array.

6. The apparatus according to claim 5, wherein the MIMO performance of the subparts are configured to be measured in response to the value of the first quality metric and the second quality metric being at least equal to the corresponding threshold value.

7. The apparatus according to claim 5, wherein the circuitry is further configured to
determine a best value among the MIMO performance values of the at least first subpart and the second subpart of the antenna array;
compare the best MIMO value to a corresponding threshold value; and
control, in response to the best MIMO value being at least equal to the corresponding threshold value, the subpart of the antenna array having the best MIMO value to be used for receiving the signals according to MIMO full Rank operation.

8. The apparatus according to claim 7, wherein said circuitry is configured to control, in response to the best MIMO value being below to the corresponding threshold value, the apparatus to use the full antenna array for receiving the signals.

9. The apparatus according to claim 5, wherein the MIMO performance of the subparts are configured to be measured based on a received reference signal.

10. The apparatus according to claim 1, wherein the alignment of the antenna elements in the second subpart deviates substantially by 45° from the alignment of the antenna elements in the first subpart.

11. The apparatus according to claim 1, wherein the antenna elements of the first subpart are adjacent to each other and the antenna elements of the second subpart are adjacent to each other.

12. The apparatus according to claim 1, wherein the antenna elements of the first subpart are at least partly interleaved with the antenna elements of the second subpart.

13. A method, comprising:
determining a value of at least one quality metric for a received multiple input multiple output (MIMO) signal at a frequency;
comparing the determined value of the at least one quality metric to a corresponding threshold value; and
determining, based on the result of the comparison of the value of the at least one quality metric, whether to use a full antenna array comprising a plurality of antenna elements or either a first subpart of the antenna array comprising a first subsection of the plurality of antenna elements or a second subpart of the antenna array comprising a second subsection of the plurality of antenna elements, wherein an alignment of the antenna elements in the second subpart deviates substantially by 30°-60° from an alignment of the antenna elements in the first subpart for receiving the signal at the frequency.

14. An apparatus, comprising:
at least one processor; and
at least one memory including computer program code, the at least one memory and the computer program code being configured to, with the at least one processor, cause the apparatus at least to:
determine a value of at least one quality metric for a received multiple input multiple output (MIMO) signal at a frequency;
compare the determined value of the at least one quality metric to a corresponding threshold value; and
determine, based on the result of the comparison of the value of the at least one quality metric, whether to use a full antenna array comprising a plurality of antenna elements or either a first subpart of the antenna array comprising a first subsection of the plurality of antenna elements or a second subpart of the antenna array comprising a second subsection of the plurality of antenna elements, wherein an alignment of the antenna elements in the second subpart deviates substantially by 30°-60° from an alignment of the antenna elements in the first subpart for receiving the signal at the frequency.

* * * * *